United States Patent [19]
Jordan

[11] Patent Number: 5,811,355
[45] Date of Patent: Sep. 22, 1998

[54] ENHANCED CHEMICAL-MECHANICAL POLISHING (E-CMP) METHOD OF FORMING A PLANAR SURFACE ON A THIN FILM MAGNETIC HEAD TO AVOID POLE RECESSION

[75] Inventor: Stephen G. Jordan, Fremont, Calif.

[73] Assignee: AIWA Co., Ltd., Tokyo, Japan

[21] Appl. No.: 741,838

[22] Filed: Oct. 31, 1996

[51] Int. Cl.⁶ .................................................. B44C 1/22
[52] U.S. Cl. ............................................. 438/692; 216/22
[58] Field of Search ........................... 451/28, 41; 438/3, 438/692; 216/22, 88

[56] References Cited

U.S. PATENT DOCUMENTS 5,087,332  2/1992  Chen ........................................ 205/135

*Primary Examiner*—R. Bruce Breneman
*Assistant Examiner*—Thomas W. Weingart
*Attorney, Agent, or Firm*—Ken J. Koestner; Skjerven, Morrill, MacPherson, Franklin & Friel LLP

[57] ABSTRACT

A method of enhanced chemical-mechanical polishing (E-CMP) utilizes an oxygen-rich liquid etchant in an abrasive slurry to form a substantially planar surface on a thin film magnetic head to substantially avoid pole recession. Illumination of the thin film magnetic head with ultraviolet light during E-CMP polishing greatly enhances the effect of the oxygen-rich etchant.

17 Claims, 4 Drawing Sheets

ENHANCED CHEMICAL-MECHANICAL POLISHING (E-CMP) METHOD OF FORMING A PLANAR SURFACE ON A THIN FILM MAGNETIC HEAD TO AVOID POLE RECESSION

BACKGROUND OF THE INVENTION

1. Field of the Invention

The present invention generally relates to a method for fabricating thin film magnetic heads. More specifically, the present invention relates to a chemical-mechanical polishing (CMP) method for forming a substantially planar surface of a thin film magnetic head with substantially no recession of the thin film head poles.

2. Description of the Related Art

Thin film magnetic heads, which are constructed using advanced integrated circuit processing techniques, have been developed to improve performance of high density magnetic recording while reducing fabrication cost. Thin film magnetic heads are typically constructed using multiple substrate processing steps, including steps of deposition, etching and planarization of multiple insulative, conductive and magnetic layers.

Chemical-mechanical polishing (CMP) is a known technique for planarizing various structures on a thin film substrate. Often CMP is not only used to create a smooth, planar surface for intermediate or final processing of thin film structures, but also to remove undesirable residues that remain from other substrate processing steps.

CMP involves simultaneous chemically etching and mechanical polishing or grinding of a surface so that a combined chemical reaction and mechanical polishing removes a desired material from the substrate surface in a controlled manner. The resulting structure is a planarized thin film substrate surface with protruding surface topography leveled. CMP is typically performed by polishing a substrate surface against a polishing pad that is soaked with a slurry including an acidic or basic solvent, an abrasive agent and a suspension fluid.

CMP is used to planarize various layers of the multiple insulative, conductive and magnetic layers in the fabrication of thin film magnetic heads. Planarization is performed to achieve a substantially planar structure both for intermediate processing steps and a final processing step of thin film magnetic head fabrication.

One problem that arises with CMP planarization of thin film surfaces, including surfaces formed in the fabrication of thin film magnetic heads, is that a substantially planar surface is difficult or impossible to achieve. The different materials that form structures on the thin film surface are variably polished by the CMP process so that the polishing removes some materials more easily than other materials, yielding a disadvantageous nonuniform surface.

The variable polishing of different materials greatly hinders the fabrication of thin film magnetic heads since CMP processes are variably selective of the various magnetic, conductive, insulative and support structures formed in thin film magnetic heads. Furthermore, the selectivity of typical CMP processes is generally opposite a desired selectivity, causing a recession of thin film magnetic head structures, specifically the magnetic poles, which leads to signal loss in magnetic recording and playback.

What is needed is a chemical-mechanical polishing (CMP) process that more uniformly planarizes the structures in a thin film magnetic head. What is further needed is a CMP process that is more favorably selective of the structures in a thin film magnetic head.

SUMMARY OF THE INVENTION

In accordance with the present invention, a method of enhanced chemical-mechanical polishing (E-CMP) utilizes an oxygen-rich liquid etchant in an abrasive slurry to form a substantially planar surface on a thin film magnetic head which substantially avoids pole recession.

In accordance with an aspect of the present invention, the E-CMP method using an oxygen-rich liquid etchant in an abrasive slurry to avoid pole recession is substantially improved by illuminating the thin film magnetic head with ultraviolet (UV) light during E-CMP processing.

In accordance with one embodiment of the present invention, a thin film processing method of enhanced chemical mechanical polishing (E-CMP) a thin film substrate containing a magnetic pole and a hard frame includes the step of supplying a thin film substrate having a surface and including a nickel-iron (NiFe) magnetic pole and a diamond-like carbon (DLC) frame. The NiFe magnetic pole and the DLC frame extend to the thin film substrate surface. The thin film processing method also includes the step of polishing the thin film substrate surface using a enhanced chemical-mechanical polishing process employing a slurry which includes an oxygen-rich hydrogen peroxide ($H_2O_2$) etchant and a solid abrasive material including finely graded particles of alumina or diamond.

Several advantages are achieved using the disclosed method. One advantage is that a substantially planar surface with substantially no magnetic pole recession is achieved using the described method. Another advantage is that the etchant leaves magnetic pole regions relatively undisturbed so that the form of the poles is more easily controlled.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE PREFERRED EMBODIMENTS

Figure 1:
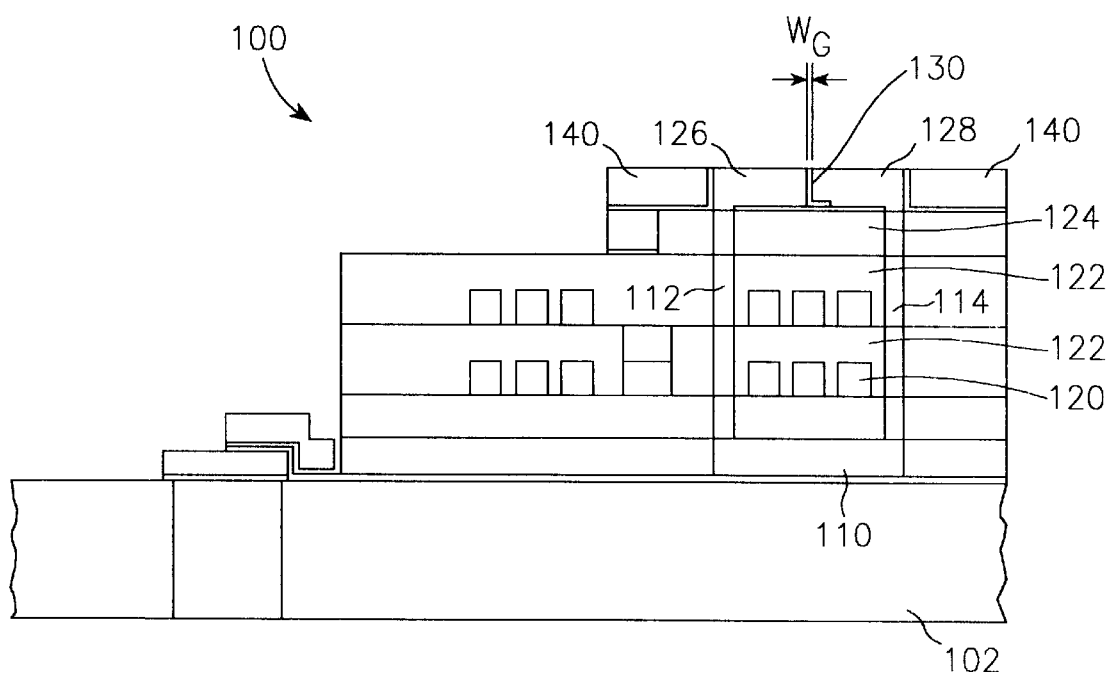
FIG. 1 is a cross sectional view of a thin film substrate including a thin film magnetic head.

Referring to FIG. 1, a thin film magnetic head 100 includes a substrate 102 and a lower pole member 110 constructed of magnetic material and formed on the substrate 102 and having first and second ends. The thin film magnetic head 100 includes first and second side pole members 112 and 114 which are also constructed of magnetic material and are positioned respectively at the first and second ends of the lower pole member 100. The first and second side pole members 112 and 114 are built up from a plurality of layers of magnetic material deposited layer upon layer. The first and second side pole members 112 and 114 include tops and bottoms. The thin film magnetic head 100 also includes a conductor coil 120 which is formed around one of the first and second side pole members 112 and 114 and is separated from the first and second side pole members 112 and 114 by insulative layers 122. The thin film magnetic head 100 further includes an insulative pedestal 124 formed at the tops of the first and second side pole members 112 and 114, the insulative pedestal 124 extending above the plane of the insulative layers 122 below and surrounding the tops of the first and second side pole members 112 and 114. The thin film magnetic head 100 includes first and second magnetic poles 126 and 128 formed overlying the insulative pedestal 124, the first magnetic pole 126 extending from the first side pole member 112 toward the second magnetic pole 128, the second magnetic pole 128 extending from the second side pole member 114 toward the first magnetic pole 126. A gap region 130 is formed between the first and second magnetic poles 126 and 128 and is filled with non-magnetic material. The thin film head 100 further includes a diamond-like carbon (DLC) frame 140 formed lateral to the first and second magnetic poles 126 and 128 and surrounding the first and second magnetic poles 126 and 128. The DLC frame 140 supplies both structural integrity and wear protection to the thin film magnetic head 100.

The magnetic pole members 110, 112, 114, 126 and 128 are constructed from a magnetic material such as nickel-iron (NiFe).

Enhanced chemical-mechanical polishing (E-CMP) utilizes application of polishing pad in a typically orbital or planetary motion to a stationary thin film substrate. The orbital or planetary motion is applied to the thin film substrate by a lapping surface of the polishing pad to planarize a plurality of structures on a substrate, typically as an intermediate step in thin film processing so that, as layers of a thin film magnetic head structure are deposited and etched, successive layers are selectively planarized. The planarization of intermediate layers is performed to ready the thin film surface for subsequent layer depositions.

E-CMP processing further involves application of a chemical slurry to the polishing pad and the thin film substrate workpiece to generate a chemical etching while the workpiece is mechanically polished. The slurry is a mixture of a chemical etchant and an abrasive compound. As the slurry and polishing motion of the polishing pad are applied to the thin film substrate workpiece, the workpiece is lapped by a lapping surface of the polishing pad.

Figure 2:
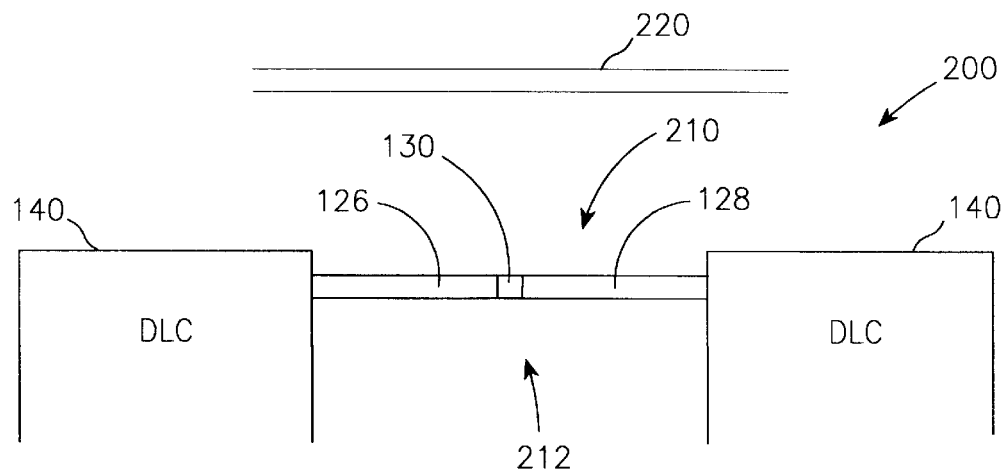
FIG. 2 is a cross sectional view of a thin film substrate including a thin film head which has a recessed magnetic pole area due to preferential chemical-mechanical polishing etching of the magnetic pole material.

Unfortunately, typical slurries for CMP processing are positively selective to the magnetic material, generally nickel-iron (NiFe), that is deposited to form the first and second magnetic poles 126 and 128 since the typical slurries naturally tend to attack NiFe more than diamond-like carbon (DLC). Referring to FIG. 2, usage of a slurry that is positively selective of NiFe, in comparison to DLC, causes the first and second magnetic poles 126 and 128 to recede below the DLC frame 140. The thin film magnetic head 200 that is fabricated using a typical slurry for E-CMP processing exhibits a head media interface (HMI) 210 in which the pole/gap region 212 is sufficiently distant from a magnetic media 220 that undesirable signal loss occurs.

Figure 3:
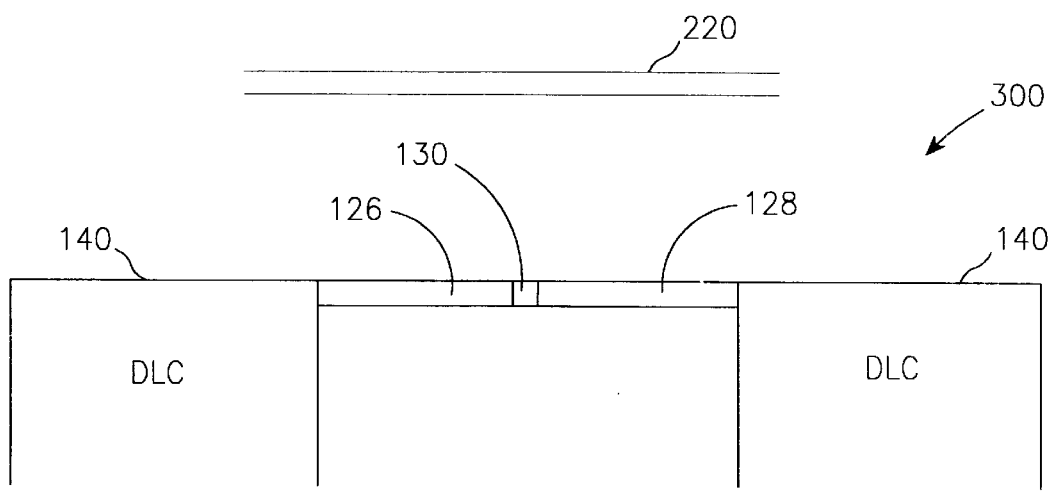
FIG. 3 is a cross sectional view of a thin film substrate including a thin film head which has a magnetic pole area substantially planar with the thin film substrate surface in accordance with the present invention.

Referring to FIG. 3, an E-CMP process that is negatively selective of NiFe in comparison to DLC or, conversely, positively selective of DLC in comparison to NiFe, is advantageously used to form a thin film magnetic head 300 having a substantially planar surface with substantially no magnetic pole recession. The E-CMP process utilizes a mechanical action which is generated by movement on a suitable surface, or "lap". The surface of a thin film substrate to be polished using E-CMP is flooded with a slurry that contains a chemical etchant and finely graded particles of a hard material such as alumina or diamond-like carbon (DLC). The finely graded particles of finely graded materials operate to remove surface layers from the DLC and enable and enhance reaction of the DLC with the etchant.

The E-CMP process uses a chemical etchant that is negatively selective of the NiFe or positively selective of the DLC so that the surface of the first and second magnetic poles 126 and 128 remains level, or slightly elevated, with respect to the DLC frame 140. An oxygen-rich liquid, such as hydrogen peroxide ($H_2O_2$), preferentially etches DLC. A lapping material which is negatively selective of the NiFe magnetic pole material uses an oxygen-rich etchant, such as hydrogen peroxide ($H_2O_2$), in the E-CMP process. In other embodiments, other oxidizing components may be used including HOCl, KOCl, $KMgO_4$, and $CH_3COOH$. A suitable range of concentration of these oxidizing components, though variable depending on which etchant is selected, the composition of the materials to be etched and physical conditions such as temperature and pressure, is from approximately 20 to 60 volume percent aqueous solution of the oxidizing component. The performance of the oxygen-rich component in the slurry is substantially improved by illuminating the processed sample with ultraviolet (UV) light during the polishing operation. The UV light greatly enhances processing by restoring the oxygen-rich component, which is otherwise rapidly decomposed.

The abrasive portion of the slurry includes finely graded particles of a hard material such as alumina or diamond. A suitable concentration of abrasive particles in the slurry ranges from approximately 20 to 50 percent. A suitable size for the abrasive particles is in the submicron range. The oxidizing chemical etchant and the abrasive material are mixed in a slurry to form the lapping material. Advantageously, when the thin film magnetic head is lapped using this etchant, the DLC is preferentially etched and the etchant leaves the NiFe pole regions 126 and 128 relatively undisturbed.

Figure 4:
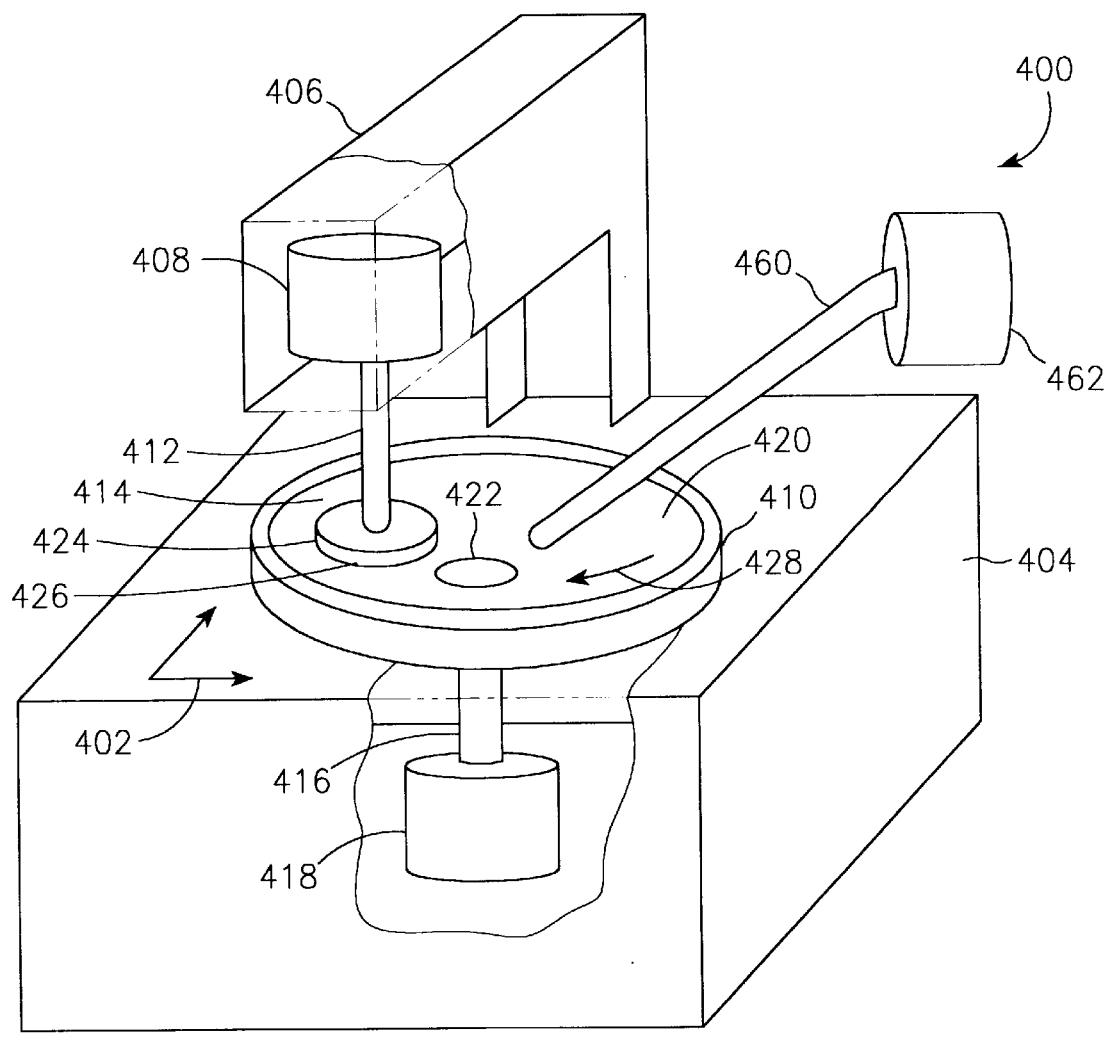
FIG. 4 illustrates a schematic pictorial diagram of a first embodiment of a polishing apparatus in accordance with an aspect of the present invention.

Referring to FIG. 4, a pictorial diagram illustrates a suitable polishing apparatus 400 for performing the described E-CMP process. The polishing apparatus 400 includes a housing 404 which forms a support structure holding a discoid turntable 410. The turntable 410 is rotated in an angular direction 428 by a turntable motor 418 which drives the turntable 410 via a turntable spindle 416. The turntable 410 is supported on an upper surface of the housing 404. The turntable 410 has the form of a cylindrical disk or plate with a radius substantially larger than the height of the cylinder. A thin film or microelectronic substrate 424 is polished using a polishing pad 420 which is affixed to an upper surface of the turntable 410. The turntable 410 centers and firmly holds the polishing pad 420. During processing of the thin film or microelectronic substrate 424, the polishing pad 420 is thoroughly wetted with slurry. The thin film or microelectronic substrate 424 is firmly held by a carrier 414 which is suspended above the turntable 410 by a carrier spindle 412. The carrier 414 is discoid, having the form of a cylindrical disk or plate with a radius substantially larger than the height of the cylinder. The carrier spindle 412 is affixed to a carrier motor 408 which is supported by a carrier support arm 406. The carrier motor 408 rotates the thin film or microelectronic substrate 424 during processing by applying a rotational drive to the carrier spindle 412 and the carrier 414. The carrier 414 centers and firmly holds the thin film or microelectronic substrate 424.

The turntable 410 is typically a thin, flat cylindrical plate with the flat surface aligned in a horizontal plane 402. The turntable 410 has a size which approximates the size of the polishing pad 420 which is used for polishing the thin film or microelectronic substrate 424. A typical turntable 410 and a typical polishing pad 420 each have a diameter of approximately 22 inches. The turntable 410 is rotated about a central axis of the turntable spindle 416 by a turntable motor 418. The rotational speed and direction of the turntable 410 is controlled by operator controls (not shown). Rotational speeds typically range, for example from 5 RPM to 100 RPM. The polishing pad 420 is a thin, flat circular disk having a flat surface in the horizontal plane 402. The polishing pad 420 is affixed to an upward-facing surface of the turntable 410 with a process surface of the polishing pad 420 facing upward for polishing the thin film or microelectronic substrate 424.

A thin film or microelectronic substrate 424 is suspended from the carrier support arm 406 and brought into contact with the polishing pad 420 for polishing. The thin film or microelectronic substrate 424 is affixed to the carrier 414, which is typically a thin, flat cylindrical plate having a flat surface aligned in the horizontal plane 402. The carrier 414 has a size which is suitable for holding the thin film substrate 424 for processing. A typical substrate 420 has a diameter of about six inches and the carrier 414 has a diameter of approximately 8 inches. The carrier 414 is rotated about a central axis of the carrier spindle 412 by a motor 408. The rotational speed and direction of the carrier 414 is controlled by operator controls (not shown). Rotational speeds typically range, for example from 5 RPM to 100 RPM. The thin film or microelectronic substrate 424 is a thin, flat circular disk which is attached to the carrier 414 so that a flat surface of the thin film or microelectronic substrate 424 is aligned in the horizontal plane 402. The thin film or microelectronic substrate 424 is affixed to a downward-facing surface 426 of the carrier 414 with a process surface of the thin film or microelectronic substrate 424 facing downward for polishing.

A fiber-optic wand 460 is connected to an ultraviolet (UV) lamp 462 and is used to illuminate a location 422 on the surface of the turntable 410 adjacent to the position of the carrier 414. The UV lamp 462 enhances the oxygen concentration in the slurry and the angular motion of the polishing pad 420 carries the oxygen-rich slurry to the carrier 414. The fiber-optic wand 460 illuminates the polishing pad 420 UV light from the UV lamp 462, for example having a wavelength of 356 nm.

The UV lamp 460 illuminates the substrate 420 with ultraviolet light to regenerate hydrogen peroxide which, by nature, rapidly decomposes. Because an oxygen-rich liquid, such as hydrogen peroxide ($H_2O_2$), preferentially etches DLC, regeneration of the oxygen-rich liquid using UV lights greatly enhances the etching of DLC while not substantially increasing the etching of the NiFe poles in a thin film magnetic head 100.

Figure 5:
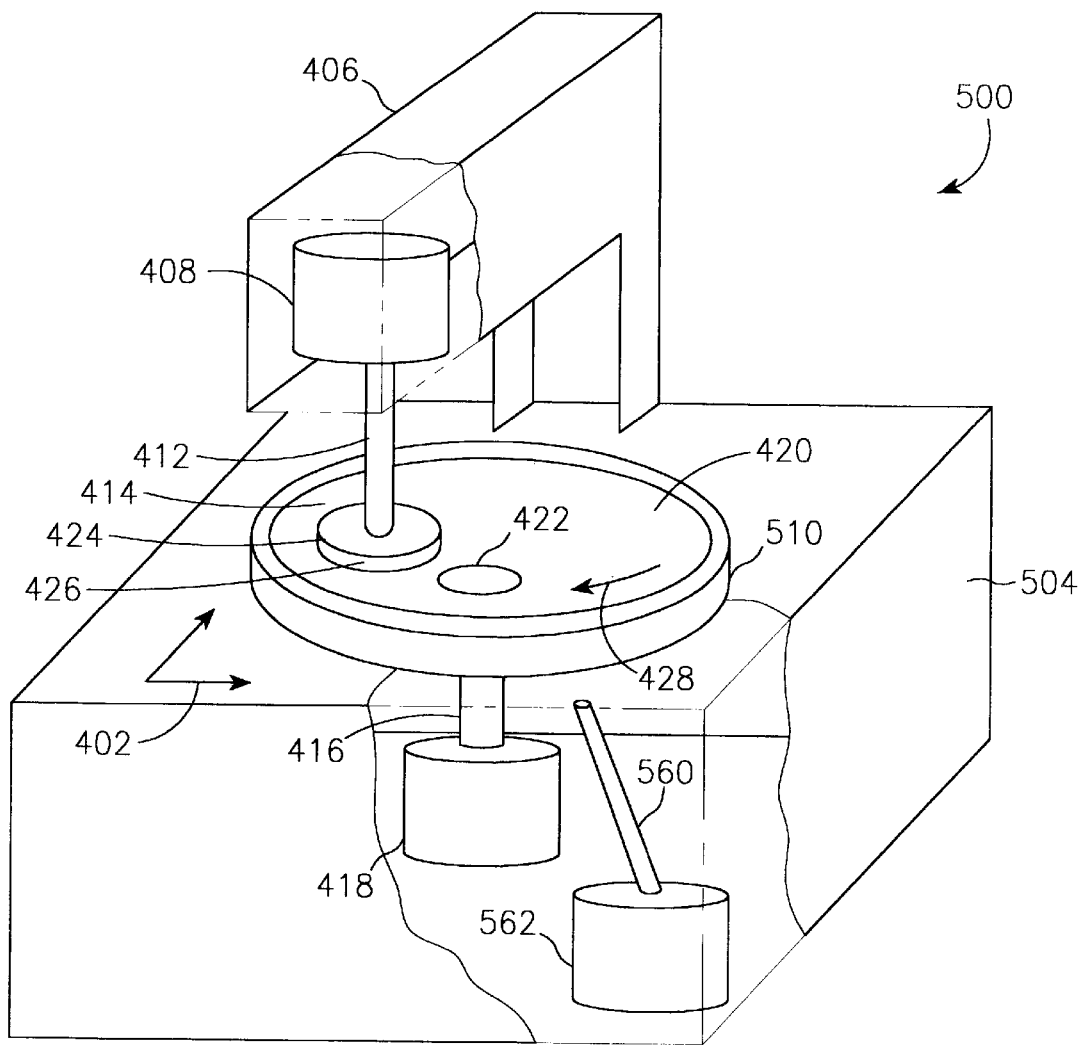
FIG. 5 illustrates a schematic pictorial diagram of a second embodiment of a polishing apparatus in accordance with an aspect of the present invention.

Referring to FIG. 5, a pictorial diagram illustrates a second embodiment of a suitable polishing apparatus 500 for performing the described E-CMP process. The polishing apparatus 500 shown in FIG. 5 is similar to the polishing apparatus 400 illustrated in FIG. 4, except that the polishing apparatus 500 includes an illumination source 560 which is positioned interior to a housing 504. Components of the polishing apparatus 500 that have the same numbers as components of the polishing apparatus 400 are the same structurally, functionally and operationally.

The illumination source 560 is attached to an ultraviolet lamp 562 which is affixed to an inner surface wall of the housing 504. Illumination from the illumination source 560 is directed upward from the interior of the housing 504 toward a location 422 on a top surface of a turntable 510 adjacent to the position of the carrier 414. The illumination is directed through an aperture (not shown) in the housing 504 and through the turntable 510. A suitable turntable 510 serves as a window, which is commonly constructed from quartz to allow illumination of the interior of the housing 504 with UV light from the UV source, for example having a wavelength of 356 nm. Other window materials, such as glass may filter the UV light unsuitably.

One advantage of the polishing apparatus 500 is that the illumination source 560 is in a controlled but fixed position in the housing 504 so that the position of the illumination source 560 and the angle at which the beam of ultraviolet illumination impinges on the polishing pad 420 is controlled and substantially constant, if desired. Thus, the ultraviolet illumination from the UV lamp 562 enhances the oxygen concentration in the slurry at the location 422 in a more controlled manner, so that the angular motion of the polishing pad 420 carries the oxygen-rich slurry with a controlled oxygenation level to the carrier 414. In one suitable embodiment, the illumination source 560 illuminates the polishing pad 420 UV light from the UV lamp 562, for example having a wavelength of 356 nm.

While the invention has been described with reference to various embodiments, it will be understood that these embodiments are illustrative and that the scope of the invention is not limited to them. Many variations, modifications, additions and improvements of the embodiments described are possible.

What is claimed is:

1. A thin film processing method of enhanced chemical mechanical polishing (E-CMP) a thin film substrate containing a magnetic pole and a hard frame comprising the steps of:

supplying a thin film substrate having a surface and including magnetic pole and a hard frame, the magnetic pole and the hard frame extending to the thin film substrate surface;

polishing the thin film substrate surface utilizing an enhanced chemical-mechanical polishing process using a slurry including an oxygen-rich etchant and a solid abrasive material, the slurry being positively selective of the hard frame in comparison to the magnetic pole.

2. A method according to claim 1 wherein the magnetic pole is a nickel-iron (NiFe) magnetic pole.

3. A method according to claim 1 wherein the hard frame is constructed from diamond-like carbon (DLC).

4. A method according to claim 1 wherein the oxygen-rich etchant includes a hydrogen peroxide ($H_2O_2$) oxidizing component.

5. A method according to claim 1 wherein the solid abrasive material includes finely graded particles of alumina.

6. A method according to claim 1 wherein the solid abrasive material includes finely graded particles of diamond.

7. A method according to claim 1 wherein:

the magnetic pole is a nickel-iron (NiFe) magnetic pole;

the hard frame is constructed from diamond-like carbon (DLC);

the oxygen-rich etchant includes hydrogen peroxide ($H_2O_2$) as an oxidizing component; and the solid abrasive material includes finely graded particles of alumina or diamond.

8. A method according to claim 1 wherein the oxygen-rich etchant includes an oxidizing component selected from a group of etchants including hydrogen peroxide ($H_2O_2$), HOCl, KOCl, $KMgO_4$, and $CH_3COOH$.

9. A method according to claim 1, further comprising the step of:

illuminating the thin film substrate with ultraviolet (UV) light during the polishing step.

10. A thin film substrate comprising a magnetic pole and a hard frame constructed using the process according to claim 1.

11. A thin film head comprising a magnetic pole and a hard frame constructed using the process according to claim 1.

12. A thin film processing method of enhanced chemical mechanical polishing (E-CMP) a thin film substrate containing a magnetic pole and a hard frame comprising the steps of:

supplying a thin film substrate having a surface and including a nickel-iron (NiFe) magnetic pole and a diamond-like carbon (DLC) frame, the NiFe magnetic pole and the DLC frame extending to the thin film substrate surface;

polishing the thin film substrate surface using an enhanced chemical-mechanical polishing process using a slurry including an oxygen-rich hydrogen peroxide ($H_2O_2$) etchant and a solid abrasive material including finely graded particles of alumina or diamond.

13. A thin film substrate comprising a magnetic pole and a hard frame constructed using the process according to claim 12.

14. A thin film head comprising a magnetic pole and a hard frame constructed using the process according to claim 12.

15. A thin film processing method of enhanced chemical mechanical polishing (E-CMP) a thin film substrate containing a magnetic pole and a hard frame comprising the steps of:

polishing the thin film substrate using an enhanced chemical-mechanical polishing (E-CMP) process;

applying a slurry including an oxygen-rich etchant and a solid abrasive material, the slurry being positively selective of the hard frame in comparison to the magnetic pole; and illuminating the thin film substrate with ultraviolet light during the E-CMP processing.

16. A thin film substrate comprising a magnetic pole and a hard frame constructed using the process according to claim 15.

17. A thin film head comprising a magnetic pole and a hard frame constructed using the process according to claim 15.

* * * * *